US008103083B2

(12) United States Patent
Schaede et al.

(10) Patent No.: US 8,103,083 B2
(45) Date of Patent: Jan. 24, 2012

(54) COUNTING STACKED DOCUMENTS

(75) Inventors: Johannes Georg Schaede, Würzburg (DE); Hartmut Karl Sauer, Himmelstadt (DE)

(73) Assignee: KBA-NotaSys SA, Lausanne (CH)

( * ) Notice: Subject to any disclaimer, the term of this patent is extended or adjusted under 35 U.S.C. 154(b) by 1346 days.

(21) Appl. No.: 11/572,451

(22) PCT Filed: Aug. 2, 2005

(86) PCT No.: PCT/IB2005/002283

§ 371 (c)(1),
(2), (4) Date: Jan. 22, 2007

(87) PCT Pub. No.: WO2006/016234

PCT Pub. Date: Feb. 16, 2006

(65) Prior Publication Data

US 2008/0105599 A1 May 8, 2008

(30) Foreign Application Priority Data

Aug. 3, 2004 (EP) .................................... 04018336

(51) Int. Cl.
*G06K 9/00* (2006.01)
*G06K 9/46* (2006.01)
*G06K 9/66* (2006.01)

(52) U.S. Cl. ........................................ 382/135; 382/192

(58) Field of Classification Search .................. 235/435, 235/379; 250/222.1, 222.2; 382/135, 100, 382/192

See application file for complete search history.

(56) References Cited

U.S. PATENT DOCUMENTS

| | | | | |
|---|---|---|---|---|
| 3,904,189 | A | 9/1975 | Murakami | |
| 3,939,621 | A | 2/1976 | Giori | |
| 3,953,022 | A * | 4/1976 | Oshima | 271/95 |
| 4,283,902 | A * | 8/1981 | Giori | 53/399 |
| 5,440,601 | A | 8/1995 | Kühfuss | |
| 5,534,690 | A * | 7/1996 | Goldenberg et al. | 250/222.1 |
| 5,626,005 | A * | 5/1997 | Klingelhoefer | 53/540 |
| 5,686,729 | A * | 11/1997 | Bittar et al. | 250/559.04 |
| 7,347,369 | B2 * | 3/2008 | Dauw et al. | 235/435 |
| 7,382,910 | B2 * | 6/2008 | Donders | 382/135 |
| 2003/0131702 | A1 | 7/2003 | Sauer | |
| 2006/0067559 | A1 * | 3/2006 | Donders | 382/100 |
| 2006/0261148 | A1 * | 11/2006 | Dauw et al. | 235/379 |

FOREIGN PATENT DOCUMENTS

| | | | |
|---|---|---|---|
| CA | 2173675 | A1 | 11/1996 |
| CH | 422834 | | 4/1967 |
| EP | 0737936 | A1 | 10/1996 |
| EP | 0743616 | A2 | 11/1996 |
| EP | 1473665 | A1 | 11/2004 |
| WO | 2004/059585 | A1 | 7/2004 |

* cited by examiner

*Primary Examiner* — John Strege

(74) *Attorney, Agent, or Firm* — Seager, Tufte & Wickhem, LLC

(57) ABSTRACT

The process for treating stacks formed of a predetermined number of planar substrates, such as securities, banknotes, checks and other similar documents, said securities being formed by prints on said substrates arranged in matrix-form in lines and columns, comprises the steps of (a) displacing the stack under a cutting device; (b) cutting a strip of the stack with cutting means; (c) evacuating the cut strip for liberating the front side of the stack which is under the cutting means; (d) taking an image of the front side of the stack; (e) counting the number of substrate in the stack by analyzing the image taken; (f) resuming the process at step (a) until all strips of a stack have been cut and starting with another stack.

14 Claims, 1 Drawing Sheet

COUNTING STACKED DOCUMENTS

FIELD

The present invention concerns a treatment process for planar substrates, such as securities, banknotes, checks and other similar documents, said securities being formed by prints on said substrates arranged in matrix-form in lines and columns.

More specifically, the present invention concerns a counting process for such piled substrates.

The present invention also concerns a device suitable for carrying out the process according to the invention.

BACKGROUND

Many counting processes are known in the art, in particular for counting piled planar substrates.

For example, U.S. Pat. No. 5,440,601, the content of which in incorporated by reference in the present application, discloses a counting station for counting the notes of value, in particular banknotes, of a banderoled pack of notes. In this patent, each pack of notes comprises 10 banderoled bundles of notes of 100 freshly printed notes of value, i.e. each pack contains 1000 notes of value. The packs of notes in which the notes lie one on top of the other are taken past a banderoling station and are provided with a banderole. Then, the packs of notes are tilted by 90° so that the notes lie in upright position, one behind the other in the transporting direction. Two counting devices are then provided with counting disks and the packs are taken past the counting rim of the counting disks while each counting disk leafs through the corners of the individual notes of value of each pack and counts the individual notes. Of course the transporting speed of the packs has to be precisely synchronised with the counting speed determined by the rotational speed of the disks.

Other mechanical counting devices are known from U.S. Pat. Nos. 3,953,022, 3,904,189, CH patent 422 834 and EP patent application No 0 737 936.

This first known technique of counting piled notes of securities has some drawbacks, the main one being the fact that the notes are touched by the counting device, usually a disk, which may deform said notes or even tear them thus producing notes with defects at the end of the production run, a moment where it is very difficult to replace individual notes already bundled into packs.

Other techniques used for counting sheets in a pile of sheets are known for example from EP patent application No 0 743 616, the content of which is incorporated by reference in the present application. This application discloses an apparatus and method for counting sheets in which a light source illuminates the edge of a plurality of sheets, such as a pack of sheets. A sensor array receives light reflected from the edge and generates a signal representative of the reflected light corresponding to the sheets. This signal is then processed along one dimension of the edge to count the sheets in the plurality of sheets.

U.S. Pat. Nos. 5,534,690 and 5,686,729 disclose other counting devices and methods using optical means.

Finally, European patent application No03009915.4 filed on Apr. 30, 2003 in the name of KBA-GIORI S. A., the content of which is enclosed by reference in the present application, discloses a counting process for counting planar substrates, such as sheets of securities or banknotes, checks, cards and other similar objects, piled in a pack, comprising the steps of (a) loosening the pack of piled substrates;

(b) taking a first image of the edges of the piled planar substrates on a first counting side of said pack, said image being made of a two-dimensional array of single image detectors arranged in lines and columns;

(c) for each column of single image detectors of said array, counting the number of edges of substrates detected in each line of single image detectors to obtain a counting value for each column;

(d) statistically treating the result obtained from step (c) for determining which counting values are obtained and how often;

(e) based on the statistical treatment, determining whether the counting is accurate.

This method is relatively complicated and involves a statistical treatment of the information to determine the accuracy of the counting.

On the other hand, cutting processes and methods are known in the art.

As an example, US patent application published under the number US 2003/0131702 on Jul. 17, 2003, the content of which is incorporated by reference in the present application, discloses a method and device to cut securities, such as securities or banknotes. In this patent application, securities, in particular bank notes, are printed onto sheets which each contain a specific number of these imprints of individual papers of value, which are arranged in matrix form, that is to say in rows and columns, the total number of imprints per sheet naturally depending on the dimensions of the sheet and the size of each imprint. Furthermore, a free strip must remain between each sheet edge and the imprints in each outer row or each outer column, in order that the sheets can be gripped by grippers to be transported in the printing presses and can be held firmly on the rolls during the printing of the actual papers of value. These free strips further permit the imprint of reference marks on each sheet, with which the maintenance of register of the sheets can be ensured if successive printing operations have to be superimposed without gaps or lined up in rows without gaps. This maintenance of register is also important when a plurality of various printing techniques are used at the same time and the sheet runs successively through a plurality of machines.

Following the printing of the individual papers of value, the sheets are stacked, each stack containing a specific number of sheets, for example 100. The sheet stacks are then fed to a machine which cuts them up into stacks of individual papers of value, which can then be sorted in order to separate out misprints or can be packed in packs. During the cutting method, the free strips and the papers of value themselves are therefore cut.

In the method known from US 2003/0131702, a stack of 100 sheets undergoes several cutting steps and rotation to cut the stack into successive strips of prints and then said strips are cut into successive stacks of individual securities. The stacks are transported out of the cutting machine for further processing operations, such as counting of the securities, banderoling into packs, as is known in the art.

U.S. Pat. No. 4,283,902, the content of which is incorporated by reference in the present application, discloses another example of a process and apparatus for converting piles of freshly printed sheets of bank notes into bundles of bank notes. In this patent, piles of freshly printed sheets of multiple bank notes are cut into bundle strips and then these bundle strips are cut into individual bundles of bank notes. A banding station is located between the cutting unit cutting the piles of sheets into bundles of strips and the cutting unit cutting these bundle strips into bundle of bank notes and comprises as many banding device operating in synchronism and located in one row as there are individual bank notes per strip so that the bundles of each strip are banded before this strip is cut into bundles.

Finally, U.S. Pat. No. 3,939,621 discloses a method for the processing of sheets of printed security papers into bundles and packets.

SUMMARY

It is an aim of the present invention to improve the known processes and devices to count piled substrates such as sheets of securities.

It is another aim of the present invention to provide a simple and reliable process to count the piled substrates.

Another aim of the present invention is to provide a quick counting process.

To this effect, the invention complies with the definition of the claims.

BRIEF DESCRIPTION

The invention will be best understood with reference to the drawings in which

DETAILED DESCRIPTION

Figure 1:
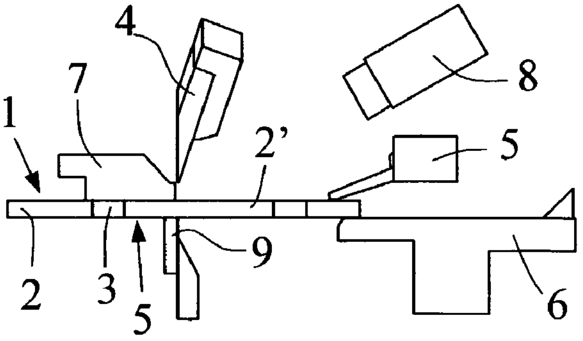
FIG. 1 shows a side view of the cutting machine before the cutting operation.

The process according to the invention is meant for treating, in particular for counting, planar substrates, such as securities, banknotes, checks and other similar documents, said securities being formed by prints on said substrates arranged in matrix-form in lines and columns.

Before the process per se, a piling of the substrates is performed until a predetermined number of piled substrate is obtained in a stack. Usually, in the art of producing securities, the number of piled substrates is 100 but other values can be used.

Then the process comprises the steps of displacing the stack under a cutting device and cutting a strip of the stack with cutting means. This part of the process can be carried out, for example, according to the methods disclosed in the prior art publications incorporated in the present application by reference to this effect and for the sake of completeness, for example U.S. Pat. No. 4,283,902.

Once the cutting of a strip has been carried out, the cut strip is evacuated in order to liberate the front side of the stack which is under the cutting means.

Then, the process includes the taking of an image of the front side of the stack said image being then used to count the number of substrate in the stack by data analysis. Of course, in principle, the number should be equal to the number of piled substrates (i.e. 100 in the example mentioned above) and a different value is the sign of a defect in the stack, for example one or several missing substrates, or a torn substrate or even a folded substrate.

The process of cutting and counting is of course resumed until all strips of a stack have been cut. Then, it can be started again with a new stack.

Preferably, the stack of substrates is compressed by compression means next to the cutting position, in order to facilitate a precise cutting of the strips. This compression is advantageous when taking the image of the front side of the stack in compressed state, just after the cutting of a strip, since it allows to take a more precise image.

It is possible to take an image of the entire front side of the stack with one imaging device, or to take several images of several parts of the front side with several imaging devices. In this latter case, it becomes then further possible to determine a counting value for each of said several images and to compare said values between them.

To analyse the image taken and determine the number of piled substrates, it is possible to use known algorithms. For example, the method for counting sheets disclosed in EP 0 743 616, the content of which is incorporated by reference in the present application, can be applied in the present case. Accordingly, reference is made to this entire publication for a counting method.

In any case, if the counted value or values do not correspond to the expected value, for example 100, an error signal can be issued in the treatment machine.

In the figures, the process and machine are represented treating strips of piled notes, the cutting operation producing piles of individual notes. As can be readily understood from the present description, the counting process according to the invention can be used with no limitation at any stage in a production machine for piled substrates when a cutting operation of a pile is carried out. This can be the case when forming strips of piled substrates from piled sheets of substrates, or when forming piles of individual notes from strips of piled substrates.

In the figures also, identical parts have been referenced with identical reference numbers.

In FIG. 1, strips 1 of individual notes 2, which have been banderoled with a band 3 are placed under a knife 4. The leading edge of the piles of individual notes which is going to be cut from the strips is held by gripper means 5 and 6.

Compression means 7, such as a pressure plate, are applied to the strips (shown in compression position in FIG. 1) before the cutting operation per se is carried out. A camera 8 is also present to take an image of the front edge of the strips 1 once the cutting operation has been carried out.

Figure 2:
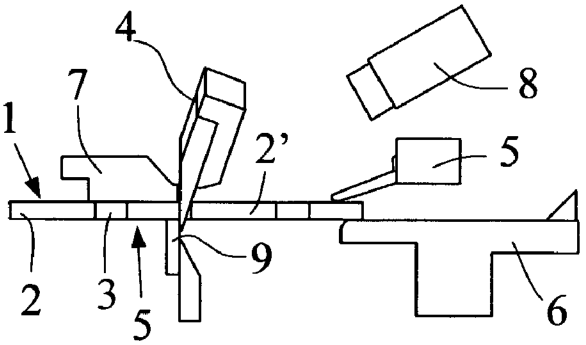
FIG. 2 shows a side view of the cutting machine after the cutting operation.

In FIG. 2, the cutting operation has taken place with the cutting means, i.e. the knife 4, having been through the piles in the direction of an anvil 9. Piles 2' of individual notes are now separated from the strips by virtue of the cutting operation.

Figure 3:
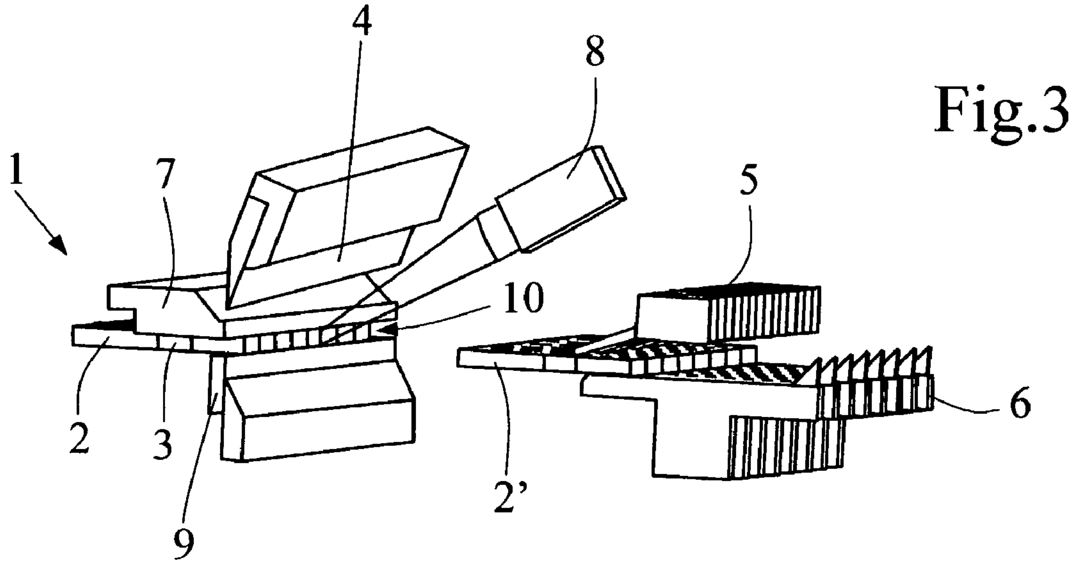
FIG. 3 shows a perspective view of the cutting machine when an image is taken.

In FIG. 3, the pressure means 7 are maintained in a pressing position, the knife 4 is moved away as are the piles of individual notes 2' by gripper means 5 and 6 in order to clear the front side 10 of the piles of strips 1 under the pressure means 7. The camera 8, for example a CCD camera or a suitable scanner, takes an image of the front side 10 and the image is then treated in appropriate means, such as a computer system (not shown) to determine the number of counted substrates. As mentioned above, the method applied to analyse the images and count the piled substrates can be the one disclosed in EP 0 743 616.

In order to improve the counting process, it is possible to take several images of a same front edge 10, for example two or more images, an then compare the values determined from each image, either to a reference value, or to each other, and/or to calculate a mean value.

Once the counting process has been carried out, the value or values determined are compared to a reference value and/or relatively to each other to determine whether the number of piled substrate is correct.

The process according to the invention has many advantages. A first advantage is the fact the since the counting is made by optical means, there is not mechanical counting devices (for example counting disks) in contact with the stack, thus decreasing the risk of a mechanical spoiling of the substrates.

Another advantage is the speed of counting. A mechanical process typically needs about 400 ms for counting 100 sheets whereas an optical process needs only about 40 ms for carrying out the same task.

Of course, the present invention is not limited to the counting of piles of individual notes, as shown in the illustrating examples. It is in fact possible to apply the idea of the invention after any cutting operation, for example after the cutting of a stack of sheets into strips, or the cutting of strips into individual notes, as is known in the prior art cited in the present application.

The invention claimed is:

1. A process for treating stacks formed of a predetermined number of planar substrates having prints arranged in matrix-form in lines and columns on the substrates, said process comprising the steps of (a) displacing the stack under a cutting device;

(b) cutting a strip of the stack with the cutting device;

(c) evacuating the strip cut by the cutting device to liberate a front side of the stack which is under the cutting device;

(d) taking an image of the front side of the stack which remains under the cutting device;

(e) counting the number of substrate in the stack by analyzing the image taken;

(f) resuming the process at step (a) until all strips of a stack have been cut and starting with another stack.

2. A process as claimed in claim 1, wherein said predetermined number is 100.

3. A process as claimed in claim 1, wherein the process comprises the step of compressing the stack before cutting a strip and maintaining said compression when taking an image of the front side.

4. A process as claimed in claim 1, wherein the image is taken at one predetermined position of the front side of the stack.

5. A process as claimed in claim 1, wherein the image is taken at more than one predetermined position of the front side of the stack.

6. A process as claimed in claim 5, wherein for each image taken the number of substrates in the stack is determined and each value of said numbers is compared.

7. A process as claimed in claim 1, wherein several images are taken from the same front edge.

8. A process as claimed in claim 7, wherein the number of piled substrates is determined in each image and compared.

9. A process as claimed in claim 6, wherein if the counted values are different, an error message is issued.

10. A process according to claim 1, wherein before step (a), the stack is cut into several strips which are each banderoled and wherein step (a) includes a feeding of the banderoled strips in parallel under the cutting device.

11. A process as claimed in claim 8, wherein if the counted values are different, an error message is issued.

12. A process as claimed in claim 1, wherein the substrates are sheets of securities, banknotes, checks or documents of the like.

13. A machine for treating stacks formed of a predetermined number of planar substrates having prints arranged in matrix-form in lines and columns on the substrates, said machine comprising:

a cutting device for cutting a stack of said predetermined number of planar substrates into strips;

means for displacing the stack under the cutting device;

means for evacuating a strip cut by the cutting device and liberating a front side of the stack remaining under the cutting device;

a camera for taking an image of the front side of the stack remaining under the cutting device; and a computer system for analyzing the image taken by the camera to determine a substrate count.

14. The machine as claimed in claim 13, further comprising compression means for applying pressure on the stack before and during cutting of the stack by the cutting device, wherein said camera takes an image of the front side of the stack while the compression means applies pressure on the stack.

* * * * *